United States Patent [19]

Ueno et al.

[11] Patent Number: 4,530,724

[45] Date of Patent: Jul. 23, 1985

[54] AZO PIGMENTS DERIVED FROM 2-HYDROXYNAPHTHALENE-3-CARBOXYLIC ACID OR ITS SALTS HAVING IMPROVED COLOR

[75] Inventors: Ryuzo Ueno, Nishinomiya; Hiroaki Tsuchiya, Kobe; Shigeru Itoh, Nishinomiya, all of Japan

[73] Assignee: Kabushiki Kaisha Ueno Seiyaku Uno Kenkyujo, Osaka, Japan

[21] Appl. No.: 413,797

[22] Filed: Sep. 1, 1982

[30] Foreign Application Priority Data

Sep. 8, 1981 [JP] Japan ................................ 56-140365

[51] Int. Cl.$^3$ ...................... C09B 29/01; C09B 29/15; C06P 1/44
[52] U.S. Cl. ............................ 106/288 Q; 106/308 Q; 106/309; 534/841; 534/842; 534/845; 534/874; 534/882
[58] Field of Search ...................... 260/197, 202, 208; 106/309, 308 Q, 288 Q

[56] References Cited

U.S. PATENT DOCUMENTS

| | | | |
|---|---|---|---|
| 350,229 | 10/1886 | Bender | 260/206 |
| 743,071 | 11/1903 | Gley et al. | 260/202 |
| 1,025,267 | 5/1912 | Heidenreich | 260/197 |
| 2,189,806 | 2/1940 | Lang et al. | 260/202 |
| 2,229,049 | 1/1941 | Dahlen et al. | 260/201 |
| 2,694,056 | 11/1954 | Ludwig et al. | 260/197 |
| 2,796,415 | 6/1957 | Ludwig et al. | 260/197 |
| 4,224,221 | 9/1980 | Burley et al. | 260/202 |

*Primary Examiner*—Floyd D. Higel
*Attorney, Agent, or Firm*—Sherman & Shalloway

[57] ABSTRACT

The color of azo pigments derived from 2-hydroxynaphthalene-3-carboxylic acid or its salts are improved by the coupling reaction of a diazonium compound of an aromatic aminosulfonic acid with a coupling component which is a mixture of (1) 2-hydroxynaphthalene-3-carboxylic acid or its salt, (2) β-naphthol or its salt, and (3) a phenolic by-product having a molecular weight of about 300 and containing about 1 equivalent of phenolic hydroxy groups. The phenolic by-product can be obtained by evaporating β-naphthol from a tarry substance formed as a by-product during the reaction of an alkali β-naphtholate with carbon dioxide, extracting the residue with an alkali and precipitating the soluble matter with an acid. The color or tone of the azo pigment is stabilized by the use of the coupling component. The azo pigments range from those having dark color and a greater degree of transparency which are suitable for use in printing inks to those having increased brightness which are suitable for use in paints.

3 Claims, No Drawings

AZO PIGMENTS DERIVED FROM 2-HYDROXYNAPHTHALENE-3-CARBOXYLIC ACID OR ITS SALTS HAVING IMPROVED COLOR

This invention relates to a process for producing azo pigments.

Azo colors derived from 2-hydroxynaphthalene-3-carboxylic acid or its salts are excellent and have been used from old. This acid is synthesized by the Kolbe-Schmitz reaction, and is used as a material for synthesizing azo colors while the separation of free β-naphthol or a by-product resinous material from it is not sufficient. If this acid in high purity is used as the starting material, the color of the resulting azo pigment has slightly greater brightness than standardized pigments. In some applications, the resulting azo pigments can exhibit much better properties than conventional pigments, but in other applications, they may be undesirable as compared with conventional ones.

The present inventors have found that when azo colors are produced by using a mixture of (1) 2-hydroxynaphthalene-3-carboxylic acid or its salt, (2) β-naphthol or its salt and (3) a phenolic by-product having a molecular weight of about 300 and containing about one equivalent of phenolic hydroxyl groups, the degrees of dark color and transparency of the azo colors increase. Although no detailed reason for this has been elucidated, it is presumed that the growth of crystals during color synthesis is inhibited by the presence of the components (2) and (3). The present inventors furthered their investigations, and found that azo pigments having improved tint, mass tone and transparency can be obtained by reacting various mixtures of the components (1), (2) and (3) with a diazonium compound of an aromatic aminosulfonic acid.

Thus, according to this invention, there is provided a process for producing an azo pigment, which comprises reacting a mixture composed of (1) 2-hydroxynaphthalene-3-carboxylic acid or its salt, (2) β-naphthol or its salt and (3) a phenolic by-product having a molecular weight of about 300 and containing phenolic hydroxyl groups and obtained during the reaction of an alkali β-naphtholate and carbon dioxide, with a diazonium compound of an aromatic aminosulfonic acid, and if desired, converting the product to a lake.

The phenolic by-products (3) can be obtained by evaporating β-naphthol from a tarry substance formed as a by-product during the reaction of an alkali β-naphtholate with carbon dioxide, extracting the residue with an alkali, and precipitating the soluble matter with an acid. It is assumed from liquid chromatography that the phenolic by-product contains a plurality of compounds. From the deflection point of its neutralization titration curve and the amount of the alkali consumed, it is observed that the phenolic by-product has a molecular weight of about 300 and contains about one equivalent of phenolic hydroxyl group.

The salt of 2-hydroxynaphthalene-3-carboxylic acid and the salt of β-naphthol are suitably sodium, potassium, and strontium salts, for example.

The diazonium compound of an aromatic aminosulfonic acid may be those derived from aniline or naphthylamines and having as a substituent on the aromatic ring a sulfo group and optionally a halogen atom, an alkyl group, a nitro group, a hydroxyl group, an alkoxy group, a sulfone group, a methanesulfonic acid group, an acylamino group or an arylcarbonylamino group.

In a preferred embodiment of this invention, a mixture composed of 90 to 99.9% by weight of 2-hydroxynaphthalene-3-carboxylic acid or its salt, 0.1 to 9.9% by weight of β-naphthol or its salt and 9.9 to 0.1% by weight of the phenolic by-product is reacted with a diazonium compound of an aromatic aminosulfonic acid, and if required, the product is converted to a lake.

The above three-component mixture is prepared conveniently by, for example, mixing an aqueous alkaline solution of the phenolic by-product with an alkaline solution of 2-hydroxynaphthalene-3-carboxylic acid and β-naphthol so that the weight ratio of 2-hydroxynaphthalene-3-carboxylic acid, β-naphthol and the phenolic by-product is about 5:3:2, precipitating the mixture with an acid, filtering the product and drying it, and mixing the resulting product with a predetermined amount of 2-hydroxynaphthalene-3-carboxylic acid.

The coupling reaction between the mixture of the components (1), (2) and (3) and a diazonium compound of an aromatic aminosulfonic acid can be carried out in a customary manner. Lake formation can also be effected in a customary manner. Preferred lakes are calcium salts, magnesium salts, barium salts, etc.

The present invention gives arbitrarily toned stable azo pigments ranging from those having greater brightness, and those having greater degrees of dark color and transparency, than conventional azo colors obtained from 2-hydroxynaphthalene-3-carboxylic acid. By increasing the amount of β-naphthol or its salt to be mixed, the degrees of dark color and transparency of the synthesized azo pigments increase, and the aforesaid by-product stabilizes the color of the pigments. Generally, when a pigment has a greater degree of dark color and a greater degree of transparency, its suitability for use in a printing ink increases, and when its brightness increases, it has an increased hiding power and its suitability for use in a paint increases. Thus, according to the process of this invention, pigments suitable for these uses can be easily obtained.

The following non-limitative examples specifically illustrate the present invention.

EXAMPLE 1

Twelve grams of 4-aminotoluene-3-sulfonic acid was dissolved in 200 ml of water containing 2.8 g of sodium hydroxide. Then, 15 g of 35% hydrochloric acid was added to the solution to form a precipitate. At 0° C., a solution of 4.4 g of sodium nitrite in 20 ml of water was added dropwise, and the mixture was stirred for 1 hour to perform diazotization. Five lots of the diazonium salt solution were prepared.

Separately, 12.2 g of each of mixtures having the compositions indicated in Table 1 was dissolved in 150 ml of water containing 7.3 g of sodium hydroxide and the solution was maintained at 0° C. The above diazonium salt solution was gradually added to the resulting solution. The mixture was stirred for 2 hours to perform coupling.

After the reaction, 700 ml of water was added, and the mixture was adjusted to pH 8.0–8.5 with a 10% aqueous solution of acetic acid. Then, the temperature of the solution was maintained at 18° C., and a solution of 9.1 g of calcium chloride in 40 ml of water was added. The mixture was heated to 90° C., and stirred for 30 minutes. The product was filtered, washed with water and dried to give a toned calcium lake of 2-sulfo-4-tolylazo-2-hydroxynaphthalene-3-carboxylic acid.

TABLE 1

| Composition | 2-Hydroxy-naphthalene-3-carboxylic acid | β-Naphthol | Phenolic by-product |
|---|---|---|---|
| 1 | 99.5 wt. % | 0.2 wt. % | 0.3 wt. % |
| 2 | 98.5 | 0.6 | 0.9 |
| 3 | 97.5 | 1.0 | 1.5 |
| 4 | 96.5 | 1.4 | 2.1 |
| 5 | 95.0 | 2.0 | 3.0 |

Each of the lakes obtained was kneaded with a linseed oil varnish in the amounts set forth in the Japanese Industrial Standards by means of a Hoover muller. The kneaded mixture and a standard sample were compared. The standard sample was calcium lake (C.I. Pigment Red 57) of 2-sulfo-4-tolylazo-2-hydroxynaphthalene-3-carboxylic acid set forth in the Japanese Industrial Standards. The tint, mass tone and transparency of each sample were rated on a scale of 0.5. The results are shown in Table 2.

TABLE 2

| Composition of the starting mixture of each sample | 1 | 2 | 3 | 4 | 5 |
|---|---|---|---|---|---|
| Tint | $Y_{-0.5}$ | $Y_0$ | $Y_0$ | $Y_{0.5}$ | $Y_{1.0}$ |
| Mass tone | $D_{-1.5}$ | $D_{1.0}$ | $D_0$ | $D_{0.5}$ | $D_{2.0}$ |
| Transparency | $T_{-1.0}$ | $T_{-0.5}$ | $T_0$ | $T_{0.5}$ | $T_{2.0}$ |

Note
Y: Yellowish (judged under transmitted light)
D: Dark
T: Transparent

EXAMPLE 2

Diazotization was carried out in the same way as in Example 1 except that 14.2 g of 4-amino-6-chlorotoluene-3-sulfonic acid was used instead of 4-aminotoluene-3-sulfonic acid. Using the diazonium salt and each of the mixtures indicated in Table 1, a calcium lake of 2-sulfo-5-chloro-4-tolylazo-2-hydroxynaphthalene-3-carboxylic acid was prepared.

The lake was kneaded with a linseed varnish in the amounts set forth in the Japanese Industrial Standards by means of a Hoover muller. The kneaded mixture and a standard sample were compared. The standard sample was a calcium lake (C.I. Pigment Red 48) of 2-sulfo-5-chloro-4-tolylazo-2-hydroxynaphthalene-3-carboxylic acid set forth in the Japanese Industrial Standards. The tint, mass tone and transparency of each sample were rated on a scale of 0.5. The results are shown in Table 3.

TABLE 3

| Starting mixture | 1 | 2 | 3 | 4 | 5 |
|---|---|---|---|---|---|
| Tint | $Y_{-1.0}$ | $Y_{-0.5}$ | $Y_0$ | $Y_{0.5}$ | $Y_{1.0}$ |
| Mass tone | $D_{-1.5}$ | $D_{-0.5}$ | $D_0$ | $D_{0.5}$ | $Y_{1.5}$ |
| Transparency | $T_{-1.0}$ | $T_{-0.5}$ | $T_0$ | $T_{0.5}$ | $T_{1.5}$ |

Note:
Y, D and T are as shown in the footnote to Table 2.

What is claimed is:

1. An azo pigment derived from 2-hydroxy-naphthalene-3-carboxylic acid or its salts, which comprises the azo pigment obtained by reacting a mixture composed of (1) 2-hydroxy-napthalene-3-carboxylic acid or its salt, (2) β-naphthol or its salt and (3) a phenolic by-product having a molecular weight of about 300 and containing about 1 equivalent of phenolic hydroxy groups, said phenolic by-product being obtained by evaporating β-naphthol from a tarry substance formed as a by-product obtained during the reaction of an alkali β-naphtholate with carbon dioxide, extracting the residue with an alkali, and precipitating the soluble matter with an acid, with a diazonium compound of an aromatic aminosulfonic acid.

2. The azo pigment of claim 1 wherein said mixture is composed of 90 to 99.9% by weight of the component (1), 0.1 to 9.9% by weight of the component (2) and 9.9 to 0.1% by weight of the component (3).

3. The azo pigment of claim 1 which further comprises converting the azo pigment to its lake.

* * * * *

UNITED STATES PATENT AND TRADEMARK OFFICE
CERTIFICATE OF CORRECTION

PATENT NO. : 4,530,724

DATED : July 23, 1985

INVENTOR(S) : UENO ET AL.

It is certified that error appears in the above-identified patent and that said Letters Patent is hereby corrected as shown below:

Claim 1, line 7, delete "hydroxy", insert --hydroxyl--.

Signed and Sealed this

Twenty-second Day of October 1985

[SEAL]

Attest:

Attesting Officer

DONALD J. QUIGG

Commissioner of Patents and Trademarks—Designate

UNITED STATES PATENT AND TRADEMARK OFFICE
CERTIFICATE OF CORRECTION

PATENT NO. : 4,530,724
DATED : July 23, 1985
INVENTOR(S) : UENO ET AL.

It is certified that error appears in the above-identified patent and that said Letters Patent is hereby corrected as shown below:

ON THE TITLE PAGE

Assignee: delete "Uno"; insert --Oyo--.

Signed and Sealed this

Seventh Day of January 1986

[SEAL]

Attest:

DONALD J. QUIGG

Attesting Officer

Commissioner of Patents and Trademarks